US011898331B2

(12) United States Patent
Maley (10) Patent No.: US 11,898,331 B2
(45) Date of Patent: Feb. 13, 2024

(54) SYSTEM AND METHOD FOR DETECTING OBJECTS WITHIN A WORKING AREA (71) Applicant: Caterpillar SARL, Geneva (CH)

(72) Inventor: Jacob Charles Maley, Germantown Hills, IL (US)

(73) Assignee: Caterpillar SARL, Geneva (CH)

( * ) Notice: Subject to any disclaimer, the term of this patent is extended or adjusted under 35 U.S.C. 154(b) by 429 days.

(21) Appl. No.: 17/110,049

(22) Filed: Dec. 2, 2020

(65) Prior Publication Data
US 2022/0170242 A1 Jun. 2, 2022

(51) Int. Cl.
*E02F 9/26* (2006.01)
*G06T 7/70* (2017.01)
*E02F 9/24* (2006.01)

(52) U.S. Cl.
CPC ............. *E02F 9/262* (2013.01); *E02F 9/24* (2013.01); *E02F 9/264* (2013.01); *G06T 7/70* (2017.01); *G06T 2207/30261* (2013.01)

(58) Field of Classification Search
CPC ... E02F 9/262; E02F 9/24; E02F 9/264; E02F 9/2033; E02F 9/265; E02F 9/205; G06T 7/70; G06T 2207/30261
See application file for complete search history.

(56) References Cited

U.S. PATENT DOCUMENTS

| | | | |
|---|---|---|---|
| 9,943,023 B2 | 4/2018 | Komatsu et al. | |
| 10,030,364 B2 | 7/2018 | Rosa Neto | |
| 10,704,223 B2 | 7/2020 | Aoki et al. | |
| 2013/0088593 A1* | 4/2013 | Ishimoto | E02F 9/226 348/143 |
| 2015/0161872 A1* | 6/2015 | Beaulieu | B66C 13/40 340/686.6 |
| 2015/0343976 A1* | 12/2015 | Lim | E02F 9/261 340/435 |

(Continued)

FOREIGN PATENT DOCUMENTS

| | | |
|---|---|---|
| CN | 109440852 A | 3/2019 |
| CN | 111402634 A | 7/2020 |

(Continued)

OTHER PUBLICATIONS

Written Opinion and International Search Report for Int'l. Patent Appln. No. PCT/US2021/025465, dated Mar. 10, 2022 (170 pgs).

*Primary Examiner* — Ig T An (57) ABSTRACT

A machine may receive, from one or more sensors, first data indicating a first position of a work implement within an environment and second data indicating a second position of the work implement within the environment. Based on the first position and the second position, the machine may define a working area of the work implement. The machine may receive, from one or more cameras, image data depicting at least a portion of the environment and at least a portion an object disposed within a field of view of the one or more cameras. The machine may determine, based on the image data, that the object is located outside of the working area. Based on determining that the object is located outside of the working area, the machine may refrain from causing output of an alert indicating the presence of the object outside the working area.

20 Claims, 4 Drawing Sheets

(56) References Cited

U.S. PATENT DOCUMENTS

| | | | |
|---|---|---|---|
| 2016/0176338 A1* | 6/2016 | Husted | E02F 9/24 |
| | | | 340/435 |
| 2018/0119383 A1* | 5/2018 | Glasser | E02F 9/121 |
| 2018/0141789 A1* | 5/2018 | Rudy | G06T 7/70 |
| 2019/0241124 A1* | 8/2019 | Izumikawa | B60R 11/04 |
| 2019/0318177 A1* | 10/2019 | Steinberg | G06V 10/60 |
| 2020/0048871 A1* | 2/2020 | Nishizawa | E02F 9/265 |
| 2020/0277757 A1* | 9/2020 | Kurokami | E02F 9/24 |
| 2020/0291614 A1* | 9/2020 | Kiyota | E02F 9/265 |
| 2020/0369290 A1* | 11/2020 | Cherney | E02F 3/7636 |
| 2020/0399863 A1* | 12/2020 | Aizawa | G06Q 50/08 |
| 2021/0271248 A1* | 9/2021 | Stander | E02F 9/262 |
| 2021/0388578 A1* | 12/2021 | Saito | E02F 9/24 |
| 2022/0095525 A1* | 3/2022 | Amann | G06T 7/579 |
| 2022/0154425 A1* | 5/2022 | Yamamoto | E02F 9/2203 |

FOREIGN PATENT DOCUMENTS

| | | |
|---|---|---|
| CN | 111501865 A | 8/2020 |
| EP | 3770334 A1 | 1/2021 |
| JP | 2002250055 A | 9/2002 |
| JP | 2006257724 A | 9/2006 |
| JP | 2020012323 A | 1/2020 |
| WO | 2019181874 W | 9/2019 |
| WO | WO2019172424 A1 | 9/2019 |
| WO | WO2020170527 A1 | 8/2020 |

* cited by examiner

SYSTEM AND METHOD FOR DETECTING OBJECTS WITHIN A WORKING AREA

TECHNICAL FIELD

The present disclosure relates to a system and method for detecting objects, and more particularly, to a system and method for detecting objects within a working area.

BACKGROUND

Machines, such as excavators, may be used to perform variety of tasks at a worksite. For example, excavators may be used to excavate, move, shape, contour, and/or remove material at the worksite, such as gravel, concrete, asphalt, soil, and/or other materials.

Some excavators include systems that define an area at the worksite within which the excavator is configured to operate. In such instances, the operator may be restricted from maneuvering the excavator outside of this area. Additionally, some excavators include systems that identify objects of interest, such as personnel, and provide alerts to the operator indicating the presence of such objects. However, these systems often detect an overabundance of objects at the worksite, not just within the area, and such systems may provide alerts for each of the detected objects regardless of whether there is an actual risk of contact between the machine and the object. The high volume of alerts provided by such systems may distract and/or aggravate the operator, and may lead to operator fatigue. In some instances, the operator may disable such systems and/or the alerts provided by the systems. This may lead to unwanted collisions at the worksite.

In Chinese Patent Application No. 111501865A (hereinafter referred to as "the '865 application"), a method is described for providing an electronic fence for an excavator. Specifically, as described in the '865 application, if the excavator moves beyond a first-level safe operation area, a first alarm is enabled, and when the excavator moves beyond a second-level safe operation area, a second alarm is enabled and the excavator is restricted from performing actions.

Although the '865 application describes a system for establishing working areas associated with an excavator, the system described in the '865 application is not configured to detect objects within a predetermined working area particular to the machine while excluding alerts associated with objects outside of the predetermined working area. As a result, the system described in the '865 application may still cause operator fatigue due to excessive alerts.

The systems and methods described herein are directed to addressing one or more of the deficiencies noted forth above.

SUMMARY

According to a first aspect, a machine may include a work implement, one or more sensors, one or more cameras, one or more processors, and one or more non-transitory computer-readable media storing instructions that, when executed by the one or more processors, cause the one or more processors to perform operations. The operations may include receiving, from the one or more sensors, first data indicating a first position of the work implement within an environment. The operations may include receiving, from the one or more sensors, second data indicating a second position of the work implement within the environment different from the first position. The operations may include defining, based at least in part on the first position and the second position, a working area of the work implement within the environment. The operations may include receiving, from the one or more cameras, image data depicting at least a portion of the environment and at least a portion an object disposed within a field of view of the one or more cameras. The operations may include determining, based at least in part on the image data, that the object is disposed at a location outside of the working area. The operations may include based at least in part on determining that the object is disposed at the location outside of the working area, refraining from causing output of an alert indicating the presence of the object within the working area According to a further aspect, a method may include receiving a first input associated with a first position of a work implement of a machine, where the first input is used to define a working area within an environment, and a second position of the work implement, where the second input is used to define the working area. The method includes defining, based at least in part on the first input and the second input, the working area, receiving image data depicting at least a portion of an object within a field of view of a camera of the machine, and at least a portion of the environment. The method may also include based at least in part on the image data, determining that the object is located outside of the working area and based at least in part on determining that the object is located outside of the working area, refraining from causing output of at least one alert.

According to a further aspect, a machine may include a boom, a stick having a first end movably connected to the boom, and a second end opposite the first end, and a work implement movably connected to the second end of the stick, the boom, the stick, and the work implement being moveable together, through a range of motion, relative to a frame of the machine. The machine may further include a camera coupled to the machine, the camera being positioned such that the boom, the stick, and the work implement remain at least partly within a field of view of the camera throughout the range of motion and a sensor configured to determine locations of at least one of the boom, the stick, and the work implement as the at least one of the boom, the stick, and the work implement moves through the range of motion. The machine may further include one or more processors operably connected to the camera and the sensor, and one or more non-transitory computer-readable media storing instructions that, when executed by the one or more processors, cause the one or more processors to perform operations. The operations may include receiving, from the sensor, first data indicating a first position of the work implement within an environment and second data indicating a second position of the work implement within the environment. The operations may further include defining, based at least in part on the first position and the second position, a working area of the work implement within an environment, and receiving, from the camera, image data depicting at least a portion of the environment and at least a portion of an object disposed within the field of view of the camera. The operations may further include determining, based at least in part on the image data, that the object is disposed at a location outside of the working area, and based at least in part on determining that the object is disposed at the location outside of the working area, refraining from causing output of an alert indicating the presence of the object outside the working area.

BRIEF DESCRIPTION OF THE DRAWINGS

The detailed description is described with reference to the accompanying figures. In the figures, the left-most digit of a FIG. 1 illustrates a schematic top view of an example environment including an example machine that has example components for detecting objects within a working area.

DETAILED DESCRIPTION

The present disclosure is generally directed to systems and methods for detecting objects in an environment, such as a worksite, using sensors. In some examples, a machine may define a working area within the environment. In some examples of the systems and methods, one of the sensors may detect an object in the environment and may determine whether the object is within the working area. Objects that are within the working area may cause alerts to be issued and/or movement of the machine, or a work implement connected to the machine, to be controlled. Some examples of the systems and methods described herein may suppress alerts associated with detected object(s) unless the objects are within the working area. That is, object(s) may be detected outside of the working area, within a field of view of the sensor, but alert(s) are issued for those object(s) that are detected within the working area.

Figure 1:
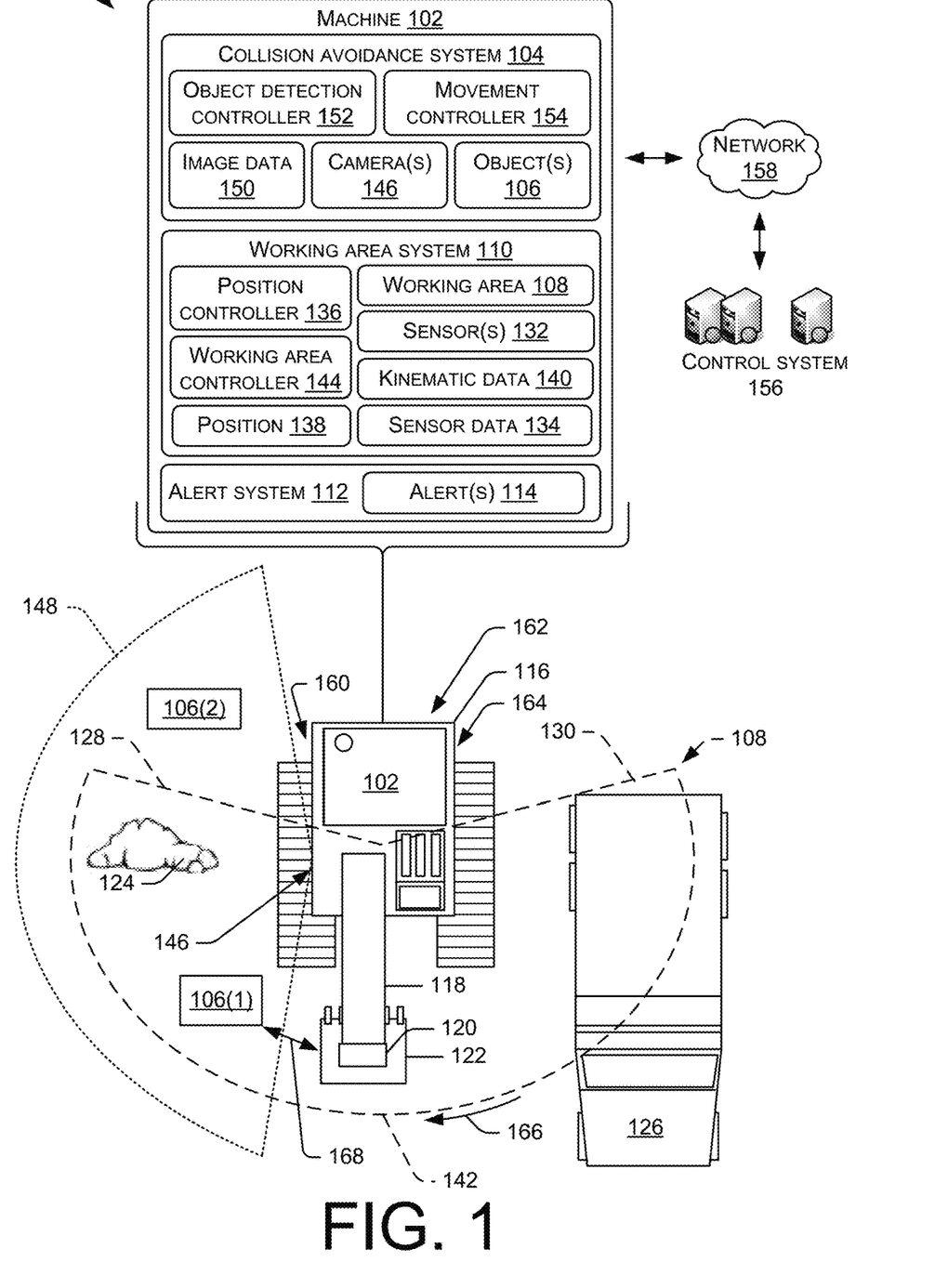

FIG. 1 is a schematic top view of an example environment 100, such as a worksite, including an example machine 102. As described herein in detail, the machine 102 includes a collision avoidance system 104 for detecting the presence or absence of objects 106 in the environment 100, and specifically, within a working area 108. As will be described in greater detail below, the working area 108 may be defined by an operator of the machine 102 and established using a working area system 110. As the operator maneuvers the machine 102, if the objects 106 are detected within the working area 108, an alert system 112 output alerts 114.

In the example of FIG. 1, the machine 102 is illustrated as an excavator. However, the machine 102 may be any type of machine configured to travel across terrain, such as an automobile, a truck, an agricultural vehicle, and/or work vehicles, such as a wheel loader, a track loader, a skid-steer loader, a mining shovel, a grader, an on highway truck, an off-highway truck, and/or any other machine known to a person skilled in the art.

The machine 102 includes a chassis or frame 116 to which is coupled a power source (e.g., engine) configured to supply power for operation of the machine 102, including, for example, operating work implements, electronics, and steering, and/or for supplying torque to drive members to propel the machine 102 across the terrain. For example, the machine 102 shown in FIG. 1 includes a pair of tracks that are configured to propel the machine 102 across pavement, gravel, dirt, or other work surfaces of the environment 100. Although the machine 102 includes tracks, it is contemplated that the machine 102 may include one or more wheels instead of, or in addition to, the tracks. The machine 102 also includes a cab coupled to the frame 116 for protecting and/or providing comfort for an operator of the machine 102, and/or for protecting control-related devices of the machine 102. In some examples, the machine 102 may be semi-autonomous or fully autonomous, and able to operate without an onboard or remote operator.

In the example shown in FIG. 1, the machine 102 has a boom 118 with a proximal end coupled to the frame 116 and configured to pivot relative to the frame 116. The machine 102 also includes a stick 120 coupled to a distal end of boom 118 and configured to pivot relative to the boom 118. The machine 102 further includes a boom actuator coupled at one end to the frame 116 and at an opposite end to the boom 118. The boom actuator is configured to extend and retract, thereby raising and lowering the distal end of the boom 118, respectively.

The machine 102 also includes a work implement 122 for performing operations associated with the machine 102, such as digging, carrying, raising, and/or depositing material. The machine 102 includes a work implement actuator coupled at one end to the frame 116 and/or to the proximal end of the boom 118. The work implement actuator is configured to extend and retract, thereby pivoting the work implement 122 between an upright orientation and an at least partially inverted orientation, for example. In the upright orientation, the work implement 122 may hold material and in the at least partially inverted orientation, the work implement 122 may deposit or dump the material. Other forms of work implements are contemplated. For example, although the work implement 122 in FIG. 1 is illustrated as a bucket, the work implement 122 may include augers, brushcutters, brooms, grapples, hammers, pulverizers, rippers, rotors, and so forth.

As shown in FIG. 1, and as introduced above, the machine 102 includes the collision avoidance system 104, the working area system 110, and/or the alert system 112. Although FIG. 1 schematically depicts the collision avoidance system 104, the working area system 110, and the alert system 112 being separate, in some examples, the collision avoidance system 104, the working area system 110, and/or the alert system 112 may be embodied within a single system.

One or more of the collision avoidance system 104, the working area system 110, and/or the alert system 112 may include one or more processors, which may execute any modules associated with the collision avoidance system 104, the working area system 110, and/or the alert system 112, as explained in further detail herein. In some examples, the processor(s) may include a central processing unit (CPU), a graphics processing unit (GPU), both CPU and GPU, or other processing units or components known in the art. Additionally, each of the processors may possess its own local memory, which also may store program modules, program data, and/or one or more operating systems.

Computer-readable media associated with the collision avoidance system 104, the working area system 110, and/or the alert system 112 may include volatile memory (e.g., RAM), non-volatile memory (e.g., ROM, flash memory, miniature hard drive, memory card, or the like), or some combination thereof. The computer-readable media may be non-transitory computer-readable media. The computer-readable media may include or be associated with the one or more of the above-noted modules, which perform various operations associated with the collision avoidance system 104, the working area system 110, and/or the alert system 112. In some examples, one or more of the modules may include or be associated with computer-executable instructions that are stored by the computer-readable media and that are executable by one or more processors to perform such operations. The collision avoidance system 104, the working area system 110, and/or the alert system 112 may also include additional components not listed above that may perform any function associated with the collision avoidance system 104, the working area system 110, and/or the alert system 112, respectively. The collision avoidance system 104, the working area system 110, and/or the alert system 112 may communicate with one another using any known wired and/or wireless communication protocols and/or networks.

The working area system 110 may be configured to establish a working area 108 around the machine 102. The working area 108 may correspond to a virtual boundary, electronic fence, or geographical-based fence around the machine 102, and represent a virtual space within which the machine 102 is configured to operate. For example, the machine 102, the frame 116, the boom 118, the stick 120, and/or the work implement 122 may operate within the working area 108. Once the working area 108 is established, the operator may be prohibited from operating the machine 102 outside of the working area 108. For example, the operator may be prohibited from operating portions (e.g., ends, sides, etc.) of the machine 102, the frame 116, the boom 118, the stick 120, and/or the work implement 122 outside of the working area 108.

As shown in FIG. 1, the machine 102 may be configured to perform a variety of different tasks at a worksite or other environment, and such tasks include loading debris 124 to a transport vehicle 126. However, the machine 102 may be moving the debris 124, or other equipment, material, refuse, etc. from one location to another in the environment 100 and/or within the working area 108. The debris 124 is shown being on a right side of the machine 102 and the transport vehicle 126 is shown being on a left side of the machine 102, however, in other examples it is understood that the debris 124 and/or the transport vehicle 126 may be disposed at other locations relative to each other and/or relative to the machine 102. The operator of the machine 102 may load the debris 124 into the work implement 122 and then swing the work implement 122 leftward to deposit the debris 124 into the transport vehicle 126. Once the debris 124 has been dumped and/or otherwise removed from the work implement 122, the operator of the machine 102 may move the work implement 122 rightward to load more of the debris 124 into the work implement 122. Between the positions at which the debris 124 is loaded into the work implement 122 and unloaded into the transport vehicle 126, the operator may horizontally and vertically move the work implement 122 or otherwise operate the machine 102.

In some examples, the working area 108 may be defined at least in part by a first boundary 128, a second boundary 130, and a peripheral boundary 142 that extends from the first boundary 128 to the second boundary 130. In some examples, the working area 108 may be established, set, or determined prior to the operator beginning work within the environment 100. For example, the operator may define the working area 108 by moving the work implement 122 to a first position associated with the first boundary 128 and then to a second position associated with the second boundary 130. That is, in the example of FIG. 1, the operator may move the work implement 122 to a position corresponding to the first boundary 128 and then horizontally move the work implement 122 to a position corresponding to the second boundary 130. While the work implement 122 is positioned at the first boundary 128 (or other position in which the operator wishes to establish a boundary) the operator may provide an indication of the first boundary 128. For example, the operator may interact with a display of the machine 102, press a button on a joystick of the machine 102, and so forth. Similarly, while the work implement 122 is positioned at the second boundary 130 the operator may provide an indication of the second boundary 130.

The machine 102 includes various sensor(s) 132 for determining relative positions of the work implement 122 and other portions of the machine 102 (e.g., the boom 118, the stick 120, etc.). These sensor(s) 132 may be disposed on various portion of the machine 102. For example, an inertial measurement unit (IMU) may be disposed on the boom 118 and the stick 120, a positional sensor may be disposed at a joint between the stick 120 and the work implement 122, and/or a rotational sensor may be disposed at the base of the boom 118 proximate to the machine 102.

The sensor(s) 132 generate sensor data 134 that indicate relative extensions, locations, positions, rotations, etc. of the machine 102, the boom 118, the stick 120, the work implement 122, and/or portions of the machine 102. While the operator is establishing the working area 108, the sensor data 134 may be used to indicate relative positions of the machine 102, the boom 118, the stick 120, the work implement 122, and/or portions of the machine 102. For example, while at the first boundary 128, the operator may provide an indication (e.g., button press) that the first boundary 128 is associated with the working area 108 (e.g., the operator wishes to establish the first boundary 128 as a boundary of the working area 108). At this time, the sensor(s) 132 may generate sensor data 134 for purposes of knowing the locations of the machine 102, the boom 118, the stick 120, the work implement 122, and/or portions of the machine 102. Similarly, when the operator wishes to establish other boundaries, such as the second boundary 130, the sensor(s) 132 may generate the sensor data 134 for knowing the locations of the machine 102, the boom 118, the stick 120, the work implement 122, and/or portions of the machine 102 at the second boundary 130.

A position controller 136 of the machine 102 may be in communication with the sensor(s) 132 via a wired and/or a wireless communication link. The position controller 136 may be configured to process the sensor data 134 to determine positions 138 of the machine 102, the boom 118, the stick 120, the work implement 122, and/or portions of the machine 102. As the position controller 136 determines these positions 138, the position controller 136 may relay this information to the working area system 110 for purposes of establishing the working area 108. For example, a working area controller 144 may associate the positions 138 of the first boundary 128 and the second boundary 130 with the working area 108. Additionally, as discussed herein, the position controller 136 may also be used for determining whether the work implement 122, or more generally the machine 102, is operating within the working area 108.

Additionally or alternatively, kinematic data 140 may be used for establishing the working area 108. The kinematic data 140 may indicate dimensions, volumes, and/or other configurations of the boom 118, the stick 120, the work implement 122, or other components of the machine 102, such as linkages, arms, etc. coupling the boom 118 and the stick 120, for example. The kinematic data 140 may indicate movement characteristics of the boom 118, the stick 120, the work implement 122, maximum extensions or ranges of the boom 118, the stick 120, the work implement 122, and so forth. The kinematic data 140 may also indicate the connections or couplings between the stick 120 and the work implement 122, for example. The kinematic data 140 may be used in conjunction with the sensor data 134 for determining the position 138 of the work implement 122 and/or portions of the machine 102. In such instances, the position 138 controller 136 may determine, based at least in part on the sensor data 134 and/or the kinematic data 140, the location of the work implement 122 within the working area 108. The position controller 136 may also be configured to determine a position, location, and/or bearing of the work implement 122 relative to the machine 102 (or portions thereof).

The working area 108 may, in some examples, be mapped or recorded in two-dimensional (2D) or three-dimensional (3D) space around the machine 102 by the working area controller 144. For example, the working area controller 144 may generate the working area 108 in a local coordinate system around the machine 102. However, in some examples, the working area controller 144 may generate the working area 108 is global position system (GPS) coordinate. As the machine 102 operates within the working area 108, the position controller 136 may continuously determine the position 138 of the machine 102, the boom 118, the stick 120, and/or the work implement 122. The positions 138 may be compared or transcribed within the working area 108 to determine the relative location of the machine 102, the boom 118, the stick 120, and/or the work implement 122 within the working area 108.

Although FIG. 1 illustrates a particular working area 108, in some examples, the operator may also move the work implement 122 about the environment 100 and indicate other positions corresponding to peripheries of the working area 108. In such instances, the working area 108 may be defined by the operator and based on specifics of the environment 100.

In some examples, if the operator moves the machine 102 to another environment, or location in the environment 100, the operator may reset or reestablish the working area 108. In some examples, the operator may be prompted to establish the working area 108 upon powering of the machine 102 or the machine 102 detecting physical movement from one location to another.

Additionally, the working area 108 may be defined using additional boundaries. For example, the operator may raise and lower the work implement 122 (i.e., vertically) to establish an upper boundary and a lower boundary relative to the machine 102. This may allow the operator to establish the working area 108 to avoid trees, overpasses, gantries, manholes, sewer/communication lines, etc. In some examples, the working area 108 may also be defined at least in part by the specifics of the machine 102. For example, the machine 102 and/or the work implement 122 may have limited range of motion (e.g., rotation), a limited range of extension (e.g., horizontal reach), and/or a limited range of lift (e.g., vertical reach). Such information may be stored in the kinematic data 140. In such examples, the working area controller 144 may accept these additional boundaries for generating the working area 108.

Moreover, the machine 102, the boom 118, the stick 120, the work implement 122, and/or other portions of the machine 102 may have sensors that recognize obstacles (e.g., walls, barriers, trees, buildings, vehicles, etc.). These obstacles may be suggested as boundaries for the working area 108 and the operator may choose to accept the suggestions as boundaries, edges, or peripherals of the working area 108.

As introduced above, once the working area 108 is defined, the operator may be prevented from rotating, lifting, or extending the work implement 122 outside of the working area 108. Moreover, the frame 116, the boom 118, and/or the stick 120 may be prevented from extending outside the working area 108. As discussed above, the working area 108 may be defined for alerting the operator and/or controlling the machine 102.

The collision avoidance system 104 may be configured to prevent collisions between the machine 102 and the object(s) 106 in the environment 100. To detect the object(s) 106, the collision avoidance system 104 may include one or more camera(s) 146 mounted onto a body (e.g., the frame 116) of the machine 102. In some instances, the machine 102 may include any number of camera(s) 146, such as one, two, or three cameras. In a two-camera embodiment, a first camera may be disposed on a right-side 160 of the machine 102 and a second camera may be disposed on a rear-side 162 of the machine 102. In a three-camera embodiment, a third camera may be disposed on a left-side 164 of the machine 102. However, the camera(s) 146 may additionally or alternatively mount to the boom 118, stick 120, and/or other portions of the machine 102.

Depending on the arrangement and orientation of the camera(s) 146, the camera(s) 146 may have a field-of-view (FOV) in front of, to the sides of, to the back of, below, and/or above the machine 102. For example, continuing with the example above, the first camera may have a FOV to the right-side, in front, and/or to the back of the machine 102, the second camera may have a FOV to the right-side, the back, and/or to the left side of the machine 102, and third camera may have a FOV to the left-side, in front, and/or to the back of the machine 102. In some examples, the camera(s) 146 may have 3D FOV for viewing objects 106 in horizontal and vertical planes.

In the example shown in FIG. 1, the machine 102 is shown including a camera 146 mounted to a right-side of the machine 102 and facing sideways. The camera 146 may have a FOV 148 that extends from the back of the machine 102 to the front of the machine 102. The FOV 148 of the camera 146, as noted above, may be substantially 180 degrees to image portions of the environment 100, as well as the working area 108, behind the machine 102, to the right of the machine 102, and in front of the machine 102. Additionally, the FOV 148 may image portions of the environment 100 above and below a horizontal plane, so as to have a vertical FOV. However, it is contemplated that the camera 146 may be mounted to other portions of the machine 102 and/or facing different directions relative to the machine 102. In some examples, at least a portion of the boom 118, the stick 120, and the work implement 122 may remain at least partly within the FOV 148 throughout the range of motion of the boom 118, the stick 120, and the work implement 122. In some examples, at least a portion of the FOVs of the camera(s) 146, respectively, map overlap.

The camera(s) 146 may generate image data 150 indicative of the environment 100. The camera(s) 146 may be any known type of analogue or digital image sensor, digital camera, and/or digital video camera. For example, the camera(s) 146 may be a high dynamic range (HDR) camera, a light-sensitive camera, and/or an ultra-sonic camera. However, other suitable types of imager(s) and/or sensor(s) are contemplated. In some examples, the camera(s) 146 may provide two-dimensional image data, three-dimensional image data, image sequences, gray image data, and/or color image data. In some examples, the camera(s) 146 may provide depth data, absorption data, and/or reflectance data. In some examples, the machine 102 may further include any known type of sensor, such as one or more light detection and ranging (LIDAR) sensors, one or more sound navigation ranging (SONAR) sensors, one or more radio detection and ranging (RADAR) sensors, or any other suitable sensor type.

The collision avoidance system 104 may include an object detection controller 152 configured to determine, based at least in part on the image data 150, the presence of object(s) 106. For example, the object detection controller 152 may be in communication with the camera(s) 146 via a wired and/or a wireless communication link. In some examples, the object detection controller 152 may be configured to identify the object(s) 106 associated with the image data 150, for example, using known image analysis techniques (e.g., digital analysis), such as by analyzing gradients in the image data 150. The object detection controller 152 may also be configured to determine a position, location, and/or bearing of the object(s) 106 relative to a position of the camera(s) 146 and/or the machine 102. In some examples, the object detection controller 152 may be configured to identify specific objects and/or recognize the presence of specific objects. For example, the object detection controller 152 may utilize one or more algorithms for identifying people. In response to receiving the image data 150, the object detection controller 152 may determine the presence, or absence, of person(s) within the image data 150. However, the image data 150 may be used to identify, or the object detection controller 152 may be trained to identify, other objects (e.g., animals, cars, etc.).

The alert system 112 may output alert(s) 114 for preventing collision(s) between the work implement 122 (and/or other portions of the machine 102) with the object(s) 106. For example, if the object(s) 106 are within the working area 108, the alert system 112 may generate an alert 114 for alerting the operator. After the collision avoidance system 104 determines the position 138 of the object(s) 106, the collision avoidance system 104 may compare the position 138 against the boundaries of the working area 108. For example, because the working area 108 and the position 138 of the object(s) 106 are represented in coordinate space, the collision avoidance system 104 may compare the coordinate positions to determine whether the alert system 112 should trigger an alert. If the coordinate position of the object(s) 106 is/are within the coordinate space of the working area 108, the alert system 112 may trigger an alert(s) 114. Here, the alert system 112 may receive signals, or other data, from the position controller 136 for determining activating the alert(s) 114. For example, upon determining that the object 106 is in the working area 108, or within a path of the work implement 122, the alert system 112 may be instructed or triggered to output the alert(s) 114.

The alert system 112 may be configured to activate device(s) upon receipt of one or more object signals indicative of the object(s) 106 in the working area 108. In some examples, the alert(s) 114 may be audible (e.g., series of beeps), visual (e.g., lights), haptic (e.g., vibrational), etc. The alert(s) 114 may be visually output on a display of the machine 102, which may include a user interface (UI) in which the operator may interface with for controlling one or more operation(s) of the machine 102. The device(s) configured to alert the operator may be mounted in the cab and/or at location(s) from which the operator is able to see and/or hear. Additionally, the collision avoidance system 104 may suppress alerts 114 associated with objects 106 that are within the FOV 148 of the camera 146, but outside of the working area 108. In such examples, the collision avoidance system 104 may detect the object 106 but avoids instructing the alert system 112 to issue the alert(s) 114 given the position of the object 106 outside of the working area 108.

In some examples, based on detecting the object(s) 106 within the working area 108, movement of the machine 102 and/or the work implement 122 may be restricted or otherwise controlled. For example, after detecting the object(s) 106, if the work implement 122 comes within a certain threshold distance of the object(s) 106, the operator may be prohibited from advancing the work implement 122 closer to the object(s) 106. For example, the collision avoidance system 104 may use the position 138 of the object(s) 106 to allow the operator to move the work implement 122 within a certain threshold distance of the object(s) 106. In some examples, the collision avoidance system 104 may continuously determine locations of the object(s) 106 via the image data 150 and locations of the work implement 122 via the sensor data 134. If the location of the work implement 122 advances towards the object(s) 106 and comes within the certain threshold distance, the collision avoidance system 104 may halt movement of the work implement 122 and/or cause the alert system 112 to output an alert 114. However, the operator, in some examples, may advance the work implement 122 away from the object(s) 106.

The collision avoidance system 104 may include a movement controller 154 configured to restrain, brake, or prevent movement of the work implement 122 in a direction towards the object(s) 106. For example, the movement controller 154 may control activation of one or more braking devices coupled to the machine 102 to slow a travel speed of the work implement 122, stop the work implement 122, and/or hold the work implement 122 at a fixed location within the working area 108. Such control may also prevent movement of the machine 102, the boom 118, and/or the stick 120.

The movement controller 154 may receive signals, or other data, from the position controller 136 for determining whether to halt or control movement of the machine 102. For example, upon determining that the object(s) 106 is/are in the working area 108, or within a path of the work implement 122, the movement controller 154 may be configured to prevent movement of the work implement 122 in a direction towards the object(s) 106.

With continued reference to FIG. 1, the environment 100 is shown including a first object 106(1) and a second object 106(2). The first object 106(1) and the second object 106(2) may be any type of object with which it would be desirable for the machine 102 to avoid a collision, such as a person. As discussed above, the first object 106(1) and the second object 106(2) may be identified via the image data 150 captured by the camera 146. In the example shown in FIG. 1, the first object 106(1) is located within the working area 108 while the second object 106(2) is located outside the working area 108.

As shown, the FOV 148 of the camera 146 may extend beyond the working area 108 in one or more coordinate directions. When the first object 106(1) is within the working area 108, alert(s) 114 may be output indicating the presence of the first object 106(1). Moreover, the movement controller 154 may prevent the operator advancing the work implement 122 in a direction 166 and/or within a certain threshold distance or proximity 168 of the first object 106(1). Comparatively, for the second object 106(2), no alert 114 may be issued given that the second object 106(2) is located outside of the working area 108. In other words, because the second object 106(2) is located beyond the first boundary 128, and therefore outside the working area 108, the work implement 122 may not contact the second object 106(2). As such, even though the second object 106(2) may be detected by the object detection controller 152, because the second object 106(2) is outside of the working area 108, no alert 114 may be issued. This filtering of alerts 114 may serve to limit the amount of alert(s) 114 generated by the alert system 112. For example, the alert system 112 may generate alerts 114 corresponding to objects 106 detected by the object detection controller 152 and identified as being disposed within the working area 108, but may suppress (or in some instances, not generate) alerts 114 corresponding to objects 106 detected by the object detection controller 152 and identified as being disposed outside of the working area 108.

Moreover, as noted above, the collision avoidance system 104 may be trained to identify specific object(s) 106, such as people. In the example of FIG. 1, for example, the transport vehicle 126 is shown being within the working area 108 but the machine 102 may still be permitted to unload the debris 124 into the transport vehicle 126. Being as the collision avoidance system 104 may be trained to identify people, even though the transport vehicle 126 may be an object within the working area 108, the detection of the transport vehicle 126 may not halt or restrain movement of the machine 102, and/or alerts 114 may not be output. In this sense, the collision avoidance system 104 may filter or refine those object(s) that trigger the alert(s) 114 and/or restrain movement.

In some examples, one or more preventative alert(s) may be output by the alert system 112 if the object(s) 106 are in close proximity to the working area 108. The alert(s) 114 may not be output, and/or control of the machine 102 and/or the work implement 122 may not be prevented, but instead, the operator may receive an indication associated with the proximity of such object(s) 106. For example, if the second object 106(2) of FIG. 1 is within a certain threshold distance of the first boundary 128 (e.g., one foot), a prewarning may be output by the alert system 112.

In some examples, the machine 102 may not have camera(s) 146 oriented directly in front of the machine 102. Instead, the operator may rely on his or her vision for locating the object(s) 106 that may be of concern and respectively controlling the machine 102 and the work implement 122. However, as the operator maneuvers (e.g., rotates) the machine 102, those object(s) 106 may come within a FOV of the camera(s) 146. Therein, alert(s) 114 may be generated if the object(s) 106 come within the working area 108.

In some examples, a control system 156 may be in communication with the machine 102 via a network 158. The control system 156 may be located in the environment 100 and/or may be located remotely from the environment 100. In any of the examples described herein, the functionality of the collision avoidance system 104, the working area system 110, and the alert system 112 may be distributed so that certain operations are performed by the machine 102 and other operations are performed remotely. For example, the operations for establishing the working area 108 may be performed by the control system 156. In such instances, the machine 102 (or another intermediary device) may be configured to transmit the sensor data 134, for example, to the control system 156 for establishing the working area 108. However, the control system 156 may additionally, or alternatively, perform other operations of the collision avoidance system 104, the working area system 110, and the alert system 112.

The components of the control system 156 may be in communication with and/or otherwise operably connected to any of the components of the machine 102 via the network 158. The network 158 may be a local area network ("LAN"), a larger network such as a wide area network ("WAN"), or a collection of networks, such as the Internet. Protocols for network communication (e.g., wireless machine-to-machine communication protocols), such as TCP/IP, may be used to implement the network 158.

Figure 2:
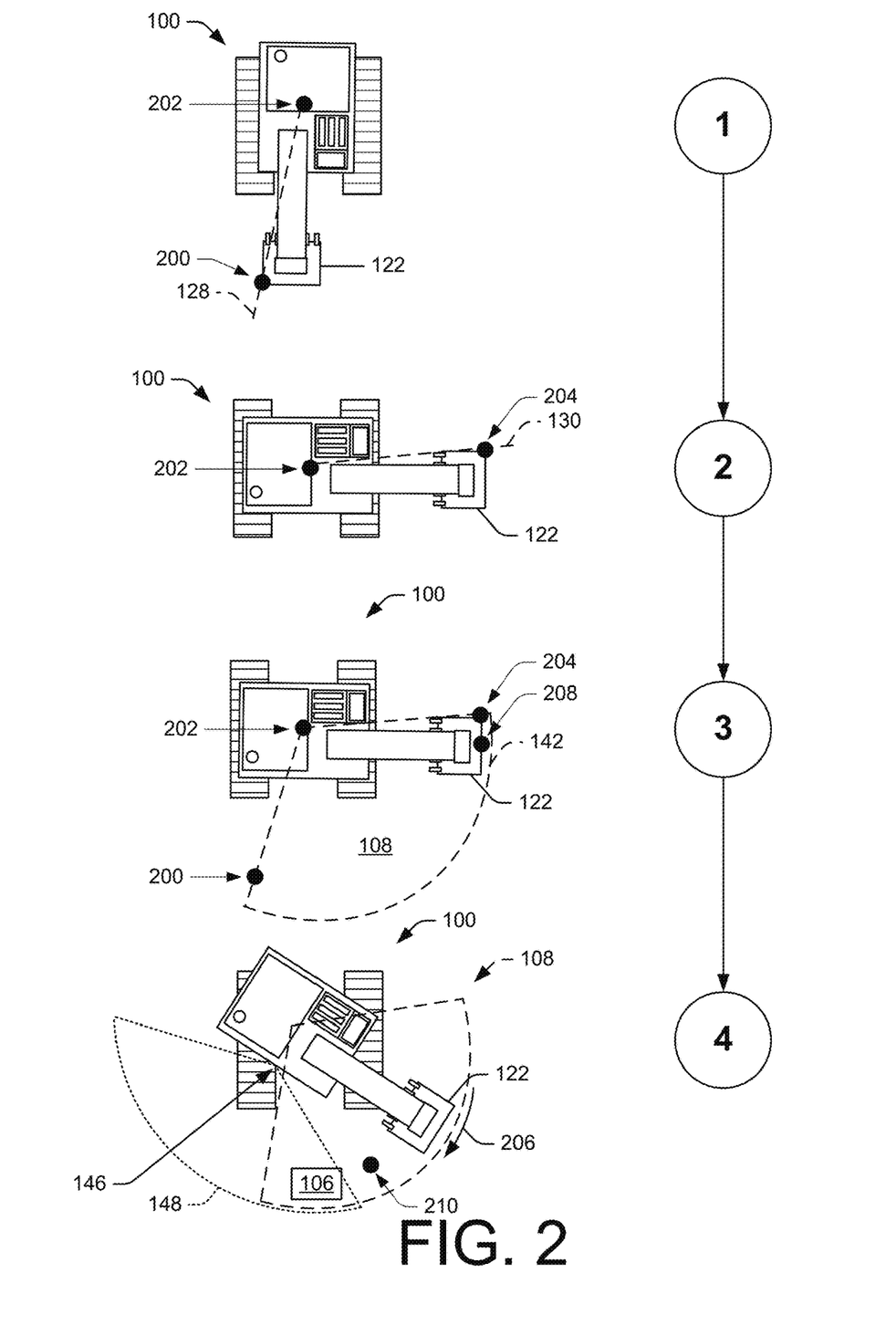
FIG. 2 illustrates a flow diagram depicting a schematic top view of an example environment including an example machine for establishing a working area, and detecting an example object within the working area.

FIG. 2 illustrates an example flow diagram associated with establishing a working area 108 and detecting whether object(s) 106 are within the working area 108. At "1" the work implement 122 may be positioned at a first position 200 associated with setting a first boundary 128 of the working area 108. For example, the operator may move the work implement 122 (using the boom 118, the stick 120, etc.) to the first position 200 in which the operator would like to establish the working area 108. The operator, in setting the first boundary 128, may extend the boom 118, the stick 120, and/or the work implement 122 to various positions. After positioning the work implement 122 at the first position 200, the operator may provide an indication to set the first position 200 as a boundary of the working area 108 (e.g., UI, button press, etc.). In some instances, the machine 102 and/or the work implement 122 may remain stationary at the first position 200 while the sensor(s) 132 generate the sensor data 134 for the first boundary 128.

In some examples, the first position 200 may be defined in local coordinate space around the machine 102. For example, while at the first position 200, the position controller 136 may record position coordinates of the machine 102, the boom 118, the stick 120, the work implement 122, and/or other portions of the machine 102. For example, using the sensor data 134 and/or the kinematic data 140, the position controller 136 may determine locations corresponding to ends and/or sides of the boom 118, ends and/or sides of the stick 120, and/or ends and/or sides of the work implement 122. As shown in FIG. 2, the first position 200 may correspond to a right-edge of the work implement 122 or an outer-most right corner of the work implement 122 relative to the machine 102.

Using the first position 200, the working area controller 144 may establish the first boundary 128. In some example, the first boundary 128 may be established using the first position 200 and a central position 202 of the machine 102. In some examples, the operator may be restrained from advancing the work implement 122 (or other portions of the machine 102) beyond a vertical plane disposed through the first position 200 and the second position 204. However, in other examples, the first boundary 128 may also be established relative to a central axis or plane of the work implement 122, or other surfaces of the work implement 122. Additionally, or alternatively, in some examples, the first boundary 128 disposed through the first position 200 may be parallel to the right-edge of the work implement 122. Additionally, in some instances, the first boundary 128 may be established at a certain offset from the work implement 122. For example, a buffer may be established between the work implement 122 and the first boundary 128 to factor in a degree of safety. That is, when establishing the first boundary 128, the first boundary 128 may be offset by a certain distance from the right-edge of the work implement 122.

At "2" the work implement 122 may be positioned at a second position 204 associated with setting a second boundary 130 of the working area 108. For example, the operator may move the work implement 122 to the second position 204 in which the operator would like to establish the working area 108. After positioning the work implement 122 at the second position 204, the operator may provide an indication to set the second boundary 130 as a boundary of the working area 108. In some instances, the machine 102 and/or the work implement 122 may remain stationary at the second position 204 while the sensor(s) 132 generate the sensor data 134 for the second boundary 130.

To define the second boundary 130, as similarly discussed above with regard to the first boundary 128, the position controller 136 may record position coordinates of the machine 102, the boom 118, the stick 120, the work implement 122, and/or other portions of the machine 102. For example, using the sensor data 134 and/or the kinematic data 140, the position controller 136 may determine locations correspond to ends and/or sides of the boom 118, ends and/or sides of the stick 120, and/or ends and/or sides of the work implement 122. As shown in FIG. 2, the second boundary 130 may correspond to a left-edge of the work implement 122 or an outer-most left corner of the work implement 122 relative to the machine 102.

Using the second position 204, the working area controller 144 may establish the second boundary 130. In some example, the second boundary 130 may be established using the second position 204 and the central position 202 of the machine 102. In some examples, the operator may be restrained from advancing the work implement 122 beyond a vertical plane disposed through the central position 202 and the second position 204. Additionally, or alternatively, in some examples, a vertical plane may be disposed through the second position 204 and parallel to the left-edge of the work implement 122 and/or may be relative to other portions of the machine 102. In some examples, the second position 204 may be located on a left-edge of the work implement 122.

At "3" the working area 108 may be established using the first boundary 128 and the second boundary 130. For example, the working area controller 144 may define the working area 108. In some instances, the working area 108 may additionally be defined based on a peripheral boundary 142 that extends from the first boundary 128 to the second boundary 130. As shown in FIG. 2, the peripheral boundary 142 may represent a curved path between the first boundary 128 and the second boundary 130. The distance from the peripheral boundary 142 to the central position 202 on the machine 102 may be based on a trajectory of the work implement 122 between the first boundary 128 and the second boundary 130. Stated alternatively, as the work implement 122 swings (e.g., rotates) between the first boundary 128 and the second boundary 130, an outer peripheral edge 208 of the work implement 122 may define the peripheral boundary 142. The peripheral boundary 142 may be determined via the position controller 136 using the sensor data 134 and/or the kinematic data 140. Alternatively, the position, shape, and/or other configurations of the peripheral boundary 142 may be determined based on the known dimensions of the machine 102, the frame 116, the boom 118, the stick 120, and/or the work implement 122.

Additionally, although FIG. 2 illustrates the working area 108 being defined at least in part by the first boundary 128 and the second boundary 130, the working area 108 may additionally or alternatively be defined using additional boundaries. For example, the work implement 122 may be raised to establish an upper boundary and/or lowered to establish a lower boundary. Here, while at positions associated with the upper boundary (e.g., powerlines) and/or the lower boundary (e.g., sewer line), the sensor(s) 132 may collect sensor data 134 for use in generating the working area 108. However, regardless of the number of boundaries, the working area controller 144 may establish or define the working area 108 relative to a local coordinate system of the machine 102. Within the working area 108, the operator may move the work implement 122. Additionally, the working area 108 may be used for establishing an area in which to alert the operator and/or restrain movement of the work implement 122.

At "4" the operator may attempt to swing the work implement 122 rightward (e.g., clockwise). However, as shown, an object 106 may be within the working area 108, proximate the first boundary 128. A camera 146 of the machine 102 may capture the object 106 within a FOV 148 of the camera 146. The object 106 may be completely or partially within the working area 108 and/or the FOV 148.

In some examples, the camera 146 may be configured to identify a type of object, such as a person. As discussed above, the collision avoidance system 104 may determine that the object 106 is within the working area 108 based at least in part on comparing position coordinates of the object 106 with that of the working area 108 (i.e., the position coordinates associated with the working area 108). Based on this comparison, the collision avoidance system 104 may determine that the object 106 is within, or is outside of, the working area 108.

In the example of FIG. 2, when the object 106 is disposed within the working area 108, the alert system 112 may trigger an alert 114 to notify the operator as the presence and/or location of the object 106. The alert 114 may be an audible alert and/or a visual alert. Additionally, or alternatively, based on detecting the object 106, the movement controller 154 may prevent the operator moving the work implement 122 and/or other portions of the machine 102 to one or more secondary locations that are within a relatively close proximity to the object 106. For example, as shown in FIG. 2, the operator may attempt to move the work implement 122, in a direction 206, towards the object 106. However, based on detecting the object 106 within the working area 108, in some examples the movement controller 154 may prohibit the work implement 122 from moving in the direction 204. In some examples, the movement controller 154 may still permit movement of the work implement 122 in the direction 206 upon detecting the object 106 within the working area 108, but may prohibit movement of the work implement 122 to a secondary location that is spaced from the object 106 by a certain (e.g., a minimum) threshold distance. For instance, in such examples the movement controller 154 may permit movement of the work implement 122 in the direction 206, but may prohibit the work implement 122 from advancing, in the direction 206, to a secondary location 210 that is spaced from the object 106 by a minimum threshold distance (e.g., six inches, one foot, etc.). The spacing of the secondary location 210 from the object 106 may factor in a degree of safety to avoid the work implement colliding with the object 106.

As discussed above, and shown in FIG. 2, the FOV 148 of the camera 146 may extend beyond the working area 108. In instances where the object(s) 106 are detected outside the working area 108, but still detected by the camera 146, the alert system 112 may output a prewarning that indicates the presence of the object 106. In some examples, the prewarning may include an audible alert that has a lower sound volume than the alert(s) 114 and/or may include a visual alert that is of a different color than the alert(s) 114. However, in examples were the pre-warnings are emitted, the operator may still operate the work implement 122 within the working area 108.

Figure 3:
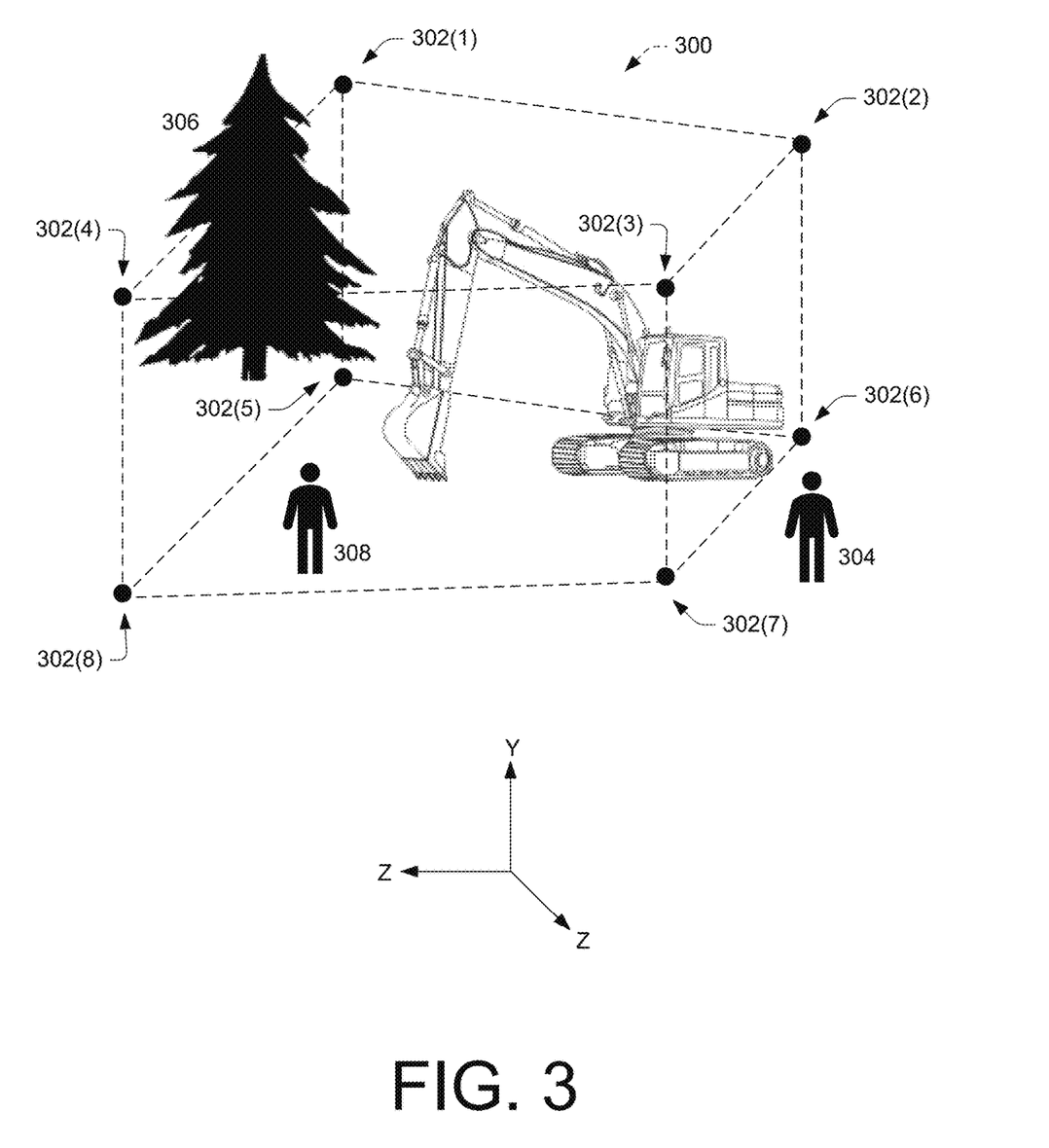
FIG. 3 illustrates an example environment for establishing a working area, and detecting objects within the working area and outside of the working area for determining whether to issue alerts.

FIG. 3 illustrates an example working area 300 established using the machine 102. The working area 300 may be defined by a plurality of points 302(1)-(8) in coordinate space (X, Y, Z). In some examples, the operator may move the work implement 122 to one or more of the points 302(1)-(8). At the points 302(1)-(8), the operator may indicate that the points 302(1)-(8) correspond to, or are used to define, corresponding points along various boundaries of the working area 300. In some examples, after indicating the points 302(1)-(8) defining the working area 300, the working area controller 144 may define the working area 108 by connecting the points 302(1)-(8) in coordinate space.

In some examples, the working area 300 may be defined relative to the machine 102. For example, using local coordinates associated with each of the points 302(1)-(8), the working area controller 144 may map the working area 300 in coordinate space. The machine 102 may represent an origin of the coordinate space where each of the points 302(1)-(8) are defined relative to the machine 102. Additionally, contours or lines connecting the points 302(1)-(8) may further define the working area 300. In this sense, the working area 108 may represent an electronic or virtual fence in which the machine 102 is configured to operate. For example, the working area 108 may be defined by a top boundary via points 302(1)-302(4), a rear boundary via points 302(1), 302(2), 302(5), and 302(6), a front boundary via points 302(3), 302(4), 302(7), and 302(8), a first side boundary via points 302(1), 302(4), 302(5), and 302(8), a second side boundary via points 302(2), 302(3), 302(6), and 302(7), and a bottom boundary via points 302(5)-302(8). Each of the boundaries may represent planes in coordinate space that the machine 102 is prohibited to operate outside of.

Within the working area 300, the operator may maneuver the machine 102 and the work implement 122. However, using the sensor data 134 and/or the kinematic data 140, the machine 102, the work implement 122, and portions of the machine 102, such as the boom 118, may be restricted from advancing outside the working area 108.

The working area 300 may be used to suppress alerts for objects that are detected outside of the working area 300. For example, as shown in FIG. 3, in some examples a first object 304 (person) and a second object 306 (tree) may be located outside the working area 300, while a third object 308 (person) may be located inside the working area 300.

Camera(s) 146 of the machine 102 (or as otherwise placed about the working area 300 and/or environment 100) may detect the first object 304, the second object 306, and/or the third object 308. For example, the camera(s) 146 may be located on sides, a top, a back, and/or a front of the machine 102. When the object detection controller 152, via the image data 150 from the camera(s) 146, detects an object inside the working area 108 and/or within a path of the work implement 122, an alert 114 may be issued. For example, in the scenario illustrated in FIG. 3, the object detection controller 152 may detect the first object 304 and the second object 306. However, the machine 102, via the collision avoidance system 104 and/or the working area system 110, may determine that the first object 304 and the second object 306 are located outside of the working area 300 and that the first object 304 and the second object 306 are outside of possible contact with the work implement 122. In such instances, even though the first object 304 and the second object 306 were detected, the alerts 114 may be suppressed given the position of the first object 304 and the second object 306 outside of the working area 300.

Comparatively, the third object 308 is located inside the working area 300. Here, the machine 102, via the collision avoidance system 104 and/or the working area system 110, may determine that the work implement 122 may collide with third object 308 may cause the alert system 112 to issue an alert 114. Additionally, or alternatively, the movement controller 154 may prevent or alter movement of the machine 102 and/or the work implement 122 when the third object 308 is detected inside the working area 300. For example, the movement controller 154 may prevent the work implement 122 from traveling to/within a certain threshold of the third object 308. In some instances, the movement controller 154 may prevent the work implement 122 moving within a horizontal and/or vertical distance of the third object 308. For example, if the work implement 122 is at a vertical height that would collide with the third object 308, the movement controller 154 may restrict movement. However, if the work implement 122 is a higher vertical height than the third object 308, the movement controller 154 may not prevent the work implement 122 from swinging overhead of the third object 308.

Additionally, although FIG. 3 illustrates the first object 304, the second object 306, and the third object 308 extend from a ground surface, the camera(s) 146 and/or the object detection controller 152 may detect objects overhead (e.g., powerlines, overpasses, etc.). Here, alerts 114 may issue and/or movement of the work implement 122 may be restricted if objects extend into the top boundary (e.g., points 302(1)-302(4)) and/or the bottom boundary (e.g., points 302(5)-302(8)).

Figure 4:
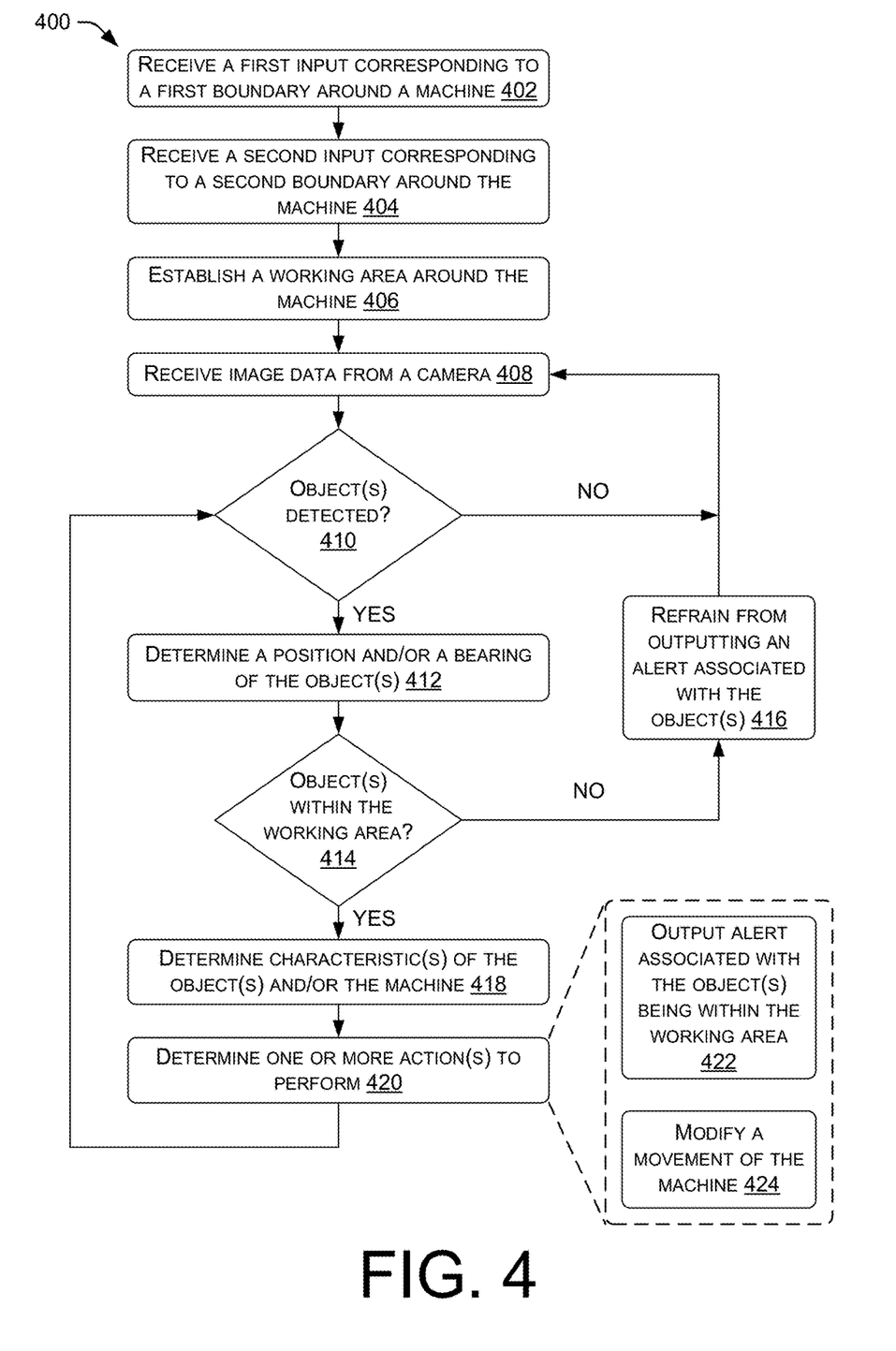
FIG. 4 illustrates an example process for detecting objects and determining whether to issue alerts.

FIG. 4 illustrates an example process 400 for detecting objects in an example environment, such as a worksite, and determining whether to output one or more alerts. The process 400 is illustrated as a logical flow graph, operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations may be combined in any order and/or in parallel to implement the process.

At 402, the working area controller 144 may receive a first input corresponding to a first boundary around a machine. For example, an operator of the machine 102 may provide an input to a joystick for moving the machine 102, or the work implement 122, to a first position associated with the first boundary 128. As discussed above, the first boundary 128 may correspond to an edge, periphery, or border of the working area 108. While the work implement 122 is positioned at the first boundary 128 and/or while the work implement 122 is stationary, the operator may provide an indication associated with establishing the first boundary 128 as part of a boundary of the working area 108. In some examples, the operator may provide the indication (e.g., a first input) via a press of a button, an input to the display (or UI), and so forth. Upon receiving the first input, the sensor(s) 132 may determine positions of the machine 102, the frame 116, the boom 118, the stick 120, and/or the work implement 122, and may generate sensor data 134 corresponding to the positions 138 of the machine 102, the frame 116, the boom 118, the stick 120, and/or the work implement 122. As discussed herein, the working area controller 144 may use the positions 138 for generating the working area 108.

At 404, the working area controller 144 may receive a second input corresponding to a second boundary around a machine. For example, the operator of the machine 102 may provide an input to the joystick for moving the machine 102, or the work implement 122, to a second position associated with the second boundary 130. As discussed above, the second boundary 130 may correspond to an edge, periphery, or border of the working area 108. As discussed above, the second boundary 130 may correspond to an edge, periphery, or border of the working area 108. While the work implement 122 is positioned at the second boundary 130 and/or while the work implement 122 is stationary, the operator may provide an indication associated with establishing the second boundary 130 as part of a boundary of the working area 108. In some examples, the operator may provide the indication (e.g., a second input) via a press of a button, an input to the display (or UI), and so forth. Upon receiving the second input, the sensor(s) 132 may determine positions of the machine 102, the frame 116, the boom 118, the stick 120, and/or the work implement 122, and may generate sensor data 134 corresponding to the positions 138 of the machine 102, the frame 116, the boom 118, the stick 120, and/or the work implement 122. As discussed herein, the working area controller 144 may use the positions 138 for generating the working area 108.

In some examples, the operator may provide additional inputs associated with establishing the working area 108. For example, the operator may raise the work implement 122 to a third boundary associated with an upper boundary of the working area 108. Additionally, or alternatively, the operator may lower the work implement 122 to a fourth boundary associated with a lower boundary of the working area 108. At these boundaries, the operator may provide indications for establishing the working area 108 via sensor data 134 generated by the sensors 132. Moreover, the operator may further define one or more additional boundaries between the first boundary 128 and the second boundary 130, such as an intermediate boundary.

In some examples, although the process 400 includes receiving inputs corresponding to the boundaries, the work implement 122 or the machine 102 may include one or more sensor(s) that identify barrier object(s) in the environment 100 for establishing the boundaries (e.g., wall, hill, overpass, etc.). These identified barriers may be recommended to the operator for establishing the working area 108. In other words, the operator may not explicitly define or provide indications for establishing the working area 108, but sensor(s) of the machine 102 may recognize boundaries and recommend these boundaries for the working area 108.

At 406, the working area controller 144 may generate a working area. For example, based on receiving the positions 138 associated with the first boundary 128 and the second boundary 130, the working area controller 144 may establish the working area 108. The working area 108 may be represented within a local coordinate system around the machine 102. The local coordinate system may indicate the positions of the first boundary, the second boundary, and/or additional boundaries. Between the first boundary 128 and the second boundary 130, the machine 102 may permit the operator to move the work implement 122. However, the machine 102 may prohibit the operator extending the work implement 122 outside of the working area 108. For example, the operator may engage with the joystick of the machine 102 to move the work implement 122. The joystick, or computing hardware of the joystick, may provide these operator commands to a controller of the machine 102. The controller may execute these commands, causing motors of the machine 102 to move the work implement 122. Additionally, the camera(s) 146 may generate the image data 150 for detecting the objects 106 and the sensor(s) 132 may generate the sensor data 134 for determining positions 138 of the work implement 122. If the operator attempts move the work implement 122 outside of the working area 108, the movement controller 154 may prohibit the command.

Moreover, in some instances, working area controller 144 may use the kinematic data 140 for establishing the peripheral boundary 142. For example, the work implement 122 may be configured to reach or extend so far from the machine 102. This reach may be used for connecting, in coordinate space, the first boundary 128 and the second boundary 130. Moreover, the work implement 122 may be configured to raise so far above the machine 102. Similarly, the working area controller 144 may use this height, or a vertical reach of the machine 102, for connecting the first boundary 128 and the second boundary 130 and generating the working area 108. However, as noted above, the operator may utilize the joystick for establishing upper boundaries and/or lower boundaries by positioning the work implement 122.

At 408, the object detection controller 152 may receive image data from a camera. For example, the object detection controller 152 may cause the camera(s) 146 of the machine 102 to image data 150 within a FOV 148 of the camera(s) 146, respectively. Therein, the camera(s) 146 may send the image data to the object detection controller 152. In some examples, the machine 102 may include any number of camera(s) 146 (e.g., one, two, three, etc.) for capturing the image data 150. The image data 150 may be captured from sides of the machine 102, behind the machine 102, and/or in front of the machine 102.

At 410, the object detection controller 152 may determine whether any object(s) are detected. For example, the object detection controller 152 may receive the image data 150 and analyze the image data 150 to determine whether the object(s) 106 are present. In some instances, the object(s) 106 may be located outside of the working area 108 and/or within the working area 108. Moreover, in some examples, the object detection controller 152 may be configured to identify specific object(s), such as person(s), using one or more trained object identification algorithms.

If, at 410, the object detection controller 152 determines that no object(s) 106 were detected (Step 410—No), the process 400 may proceed to 408. At 408, the object detection controller 152 may continue to receive image data 150 for use in detecting the presence of the object(s) 106. For example, the object detection controller 152 may receive additional image data 150 and analyze the additional image data 150 to determine whether the object(s) 106 are present.

Alternatively, if at 410 the object detection controller 152 determines that object(s) 106 were detected (Step 410—Yes), the process 400 may proceed to 412. At 412, the object detection controller 152 may determine a position and/or a bearing of the object(s). For example, the object detection controller 152, based on analyzing the image data 150, may determine a position 138 of the object(s) 106. In some examples, the position 138 of the object 106 may be represented within coordinate space around the machine 102.

At 414, the position controller 136 may determine whether the object(s) is/are within the working area. For example, the position controller 136 may compare the coordinates of the object(s) 106 with the coordinates of the working area 108 to determine whether the object(s) 106 are within the working area 108. If at 414 position controller 136 determines that the object(s) 106 are not within the working area 108 (Step 414—No), the process 400 may proceed to 416.

At 416, the collision avoidance system 104 may refrain from outputting an alert associated with the object. For example, not all object(s) 106 may be within the working area 108 given that the FOV 148 of the camera(s) 146 may be greater than the working area 108. In such instances, the object(s) 106 may not be at risk of collision with the machine 102 and/or the work implement 122. As such, because the object(s) 106 is/are outside of the working area 108, the collision avoidance system 104 may refrain from instructing the alert system 112 from outputting the alert(s) 114. From 414, the process 400 may loop to 408 whereby the process 400 may receive further image data 150 for detecting object(s) 106 and/or determining whether the object(s) 106 are within the working area 108.

Alternatively, if at 414 the collision avoidance system 104 determines that the object(s) is/are within the working area 108 (Step 414—Yes), the process 400 may proceed to 418. At 418, the process 400 may determine characteristic(s) of the object(s) and/or the machine. For example, in some instances, the characteristic(s) may be determined by the camera(s) 146 and/or sensor(s) of the machine 102. The camera(s) 146 and/or sensor(s) may classify the object 106 and report range and bearing of the object 106 relative to the sensor. The object detection controller 152 may apply offsets from a location of the camera(s) 146 and/or sensor(s) to the structure of the machine 102. In some examples, the object detection controller 152 may transmit roll/pitch/yaw/heights) regarding how the camera(s) 146 and/or sensor(s) is positioned relative to the ground. In some examples, the characteristic(s) of the object(s) 106 may include a type of object detected (e.g., person, vehicle, structure, etc.), the position of the object 106, and/or the bearing of the object 106, as determined at 412. Additionally, the characteristic(s) may include a bearing and/or direction associated with a movement of the machine 102 and/or the work implement 122, object size, object velocity, and/or material makeup (based on reflectivity). The characteristic(s) may additionally, or alternatively, include a proximity of the work implement 122 to the object 106. More generally, the characteristic(s) may be used by the collision avoidance system 104 when determining whether to output alerts and/or restrict movement of the machine 102 and/or the work implement 122.

At 420, the collision avoidance system 104 may determine one or more action(s) to perform based at least in part on the characteristics(2) determined at 418 and/or based at least in part on determining, at 414, that the objects(s) are within the working area 108. As illustrated, the one or more actions may include outputting an alert associated with the object(s) 106 being within the working area 108, at 422, and/or modifying a movement of the machine 102, at 424, For example, based at least in part on the object(s) 106 being within the working area 108, the alert system 112 may output one or more alert(s) 114 and/or the movement controller 154 may restrict movement of the work implement 122. The alert(s) 114, whether audio and/or visual, may serve to notify the operator of the detection of the object(s) 106 within the working area 108. Additionally, in some instances, the movement controller 154 to prohibit the operator advancing (e.g., swiveling, rotating, etc.) the work implement 122 and/or the machine 102 to avoid contact with the object(s) 106. In some examples, the movement controller 154 may allow the operator to operate the machine 102 and/or the work implement 122 but may not in a direction towards the object(s) 106. Furthermore, in some examples, the movement controller 154 may allow the operator to operate the machine 102 and/or the work implement 122 up to a certain threshold within the object(s) 106. For example, knowing the position 138 of the work implement 122, the movement controller 154 may prevent the work implement 122 moving within a certain threshold of the object 106.

From 420, the process 400 may return to 408 whereby the process 400 may continue to receive image data 150 for object detection.

INDUSTRIAL APPLICABILITY

The example systems and methods of the present disclosure are applicable to a variety of machines, such as, for example, an automobile, marine vehicles, a truck, an agricultural vehicle, a paving machine, a mining machine, and/or construction vehicles. Such machines may include a collision avoidance system, a working area system, and/or an alert system configured to assist a machine operator (e.g., aboard the machine or remote from the machine), or an autonomous machine, with avoiding collisions with other machines, personnel, and/or objects. The collision avoidance system may include or be communicatively coupled to an alert system configured to alert a machine operator when objects come within a working area of a machine. A working area system may define a working area representing an area within which an operator intends to operate a machine in order to perform one or more tasks (e.g., loading and unloading debris). In some examples, an operator may position a work implement at various locations within an environment for recording position coordinates corresponding to a working area. After an operator has established boundaries of a working area, a working area controller may correlate position coordinates with a working area in coordinate space. An operator may be restricted from operating the machine, or a work implement connected to the machine, outside of the boundaries of the working area.

The example collision avoidance system of the present disclosure may identify objects within and outside a working area to reduce or eliminate nuisances to an operator. By defining the working area, alert(s) may be selectively output for alerting the operator. For example, if an object is detected outside of the working area the collision avoidance system may refrain from outputting an alert because machine may not contact the object. Alternatively, if an object is detected inside the working area, the collision avoidance system m cause an alert to be output. In some examples, a movement controller may restrain operation of the work implement based on the collision avoidance system detecting object(s) within the working area. For example, the movement controller may slow a travel speed of the work implement, stop the work implement, and/or hold the work implement at a fixed location. With the collision avoidance system, the risk of contact or collisions between the machine and surrounding objects are minimized. Additionally, the collision avoidance system may reduce alerts output to the operator to reduce operator fatigue as well as instill operator trust in the collision avoidance system detecting objects.

While aspects of the present disclosure have been particularly shown and described with reference to the embodiments above, it will be understood by those skilled in the art that various additional embodiments may be contemplated by the modification of the disclosed machines, systems, and methods without departing from the spirit and scope of what is disclosed. Such embodiments should be understood to fall within the scope of the present disclosure as determined based upon the claims and any equivalents thereof.

The invention claimed is:
1. A machine, comprising:
a work implement;
one or more sensors;
one or more cameras;
one or more processors; and
one or more non-transitory computer-readable media storing instructions that, when executed by the one or more processors, cause the one or more processors to perform operations comprising:
receiving, from the one or more sensors, first data indicating a first position of the work implement within an environment;
receiving, from the one or more sensors, second data indicating a second position of the work implement within the environment different from the first position;
defining, based at least in part on the first position and the second position, an electronic fence around a working area of the work implement within the environment;
prohibiting the work implement from operating outside of the electronic fence;
receiving, from the one or more cameras, image data depicting at least a portion of the environment, at least a portion of a first object, and at least a portion of a second object disposed within a field of view of the one or more cameras;
determining, based at least in part on the image data, that the first object is disposed at a first location outside of the electronic fence and that the second object is disposed at a second location within the working area inside the electronic fence;
based at least in part on determining that the first object is disposed at the first location outside of the electronic fence, suppressing initial activation of a first alert indicating a presence of the first object; and
based at least in part on determining that the second object is disposed at the second location within the working area inside the electronic fence, causing output of a second alert indicative of the second object being disposed within the working area.

2. The machine of claim 1, wherein the field of view of the one or more cameras is greater than the working area.

3. The machine of claim 1, the operations further comprising:
receiving, from the one or more cameras, additional image data depicting at least an additional portion of the environment and the second object disposed within the field of view of the one or more cameras;
determining, based at least in part on the additional image data, that the second object is disposed at an additional location outside the electronic fence; and
based at least in part on determining that the second object is disposed at the additional location outside the electronic fence, causing the output of the second alert to terminate.

4. The machine of claim 1, the operations further comprising restricting a movement of the work implement based at least in part on determining that the second object is disposed at the second location within the working area.

5. The machine of claim 1, wherein the working area is also defined based at least in part on at least one of:
one of one or more dimensions of the work implement;
one or more dimensions of a boom of the machine; or
one or more dimensions of a stick of the machine.

6. The machine of claim 1, wherein:
the first data comprises first local coordinates defining the first position of the work implement;
the second data comprises second local coordinates defining the second position of the work implement; and
defining the electronic fence comprises defining, with third local coordinates, a peripheral boundary of the working area, the peripheral boundary extending from the first position to the second position.

7. The machine of claim 1, the operations further comprising:
at least one of:
receiving, from the one or more sensors, third data indicating a third position of the work implement within the environment different from the second position; or
receiving, from the one or more sensors, fourth data indicating a fourth position of the work implement within the environment different from the third position; and
wherein defining the electronic fence of the work implement within the environment is further based at least in part on at least one of the third position or the fourth position.

8. A method, comprising:
receiving a first input associated with a first position of a work implement of a machine, wherein the first input is used to define an electronic fence around a working area within an environment;
receiving a second input associated with a second position of the work implement, wherein the second input is used to define the electronic fence; defining, based at least in part on the first input and the second input, the electronic fence around the working area;
preventing the work implement from extending outside the electronic fence;
receiving image data depicting at least a portion of a first object and at least a portion of a second object within a field of view of one or more cameras of the machine, and at least a portion of the environment;
based at least in part on the image data, determining that the first object is located outside of the electronic fence and that the second object is located within the working area inside the electronic fence;
based at least in part on determining that the first object is located outside of the electronic fence, refraining from initially causing output of at least one first alert indicative of a presence of the first object; and
based at least in part on determining that the second object is located within the working area inside the electronic fence, causing output of at least one second alert indicative of a presence of the second object.

9. The method of claim 8, further comprising:
receiving additional image data depicting at least an additional portion of the first object within the field of view of the camera, and at least an additional portion of the environment;
based at least in part on the additional image data, determining that the first object is located within the working area inside the electronic fence; and
based at least in part on determining that the first object is located within the working area inside the electronic fence, causing the output of the at least one first alert, the at least one first alert comprising at least one of an audible alert or a visual alert.

10. The method of claim 9, further comprising based at least in part on determining that the first object is located within the working area inside the electronic fence, identifying the first object as a person and restricting a movement of the work implement.

11. The method of claim 8, further comprising identifying the second object as a person, and wherein the causing output of the at least one second alert is based at least in part on the identifying the second object as a person.

12. The method of claim 8, further comprising: receiving additional image data depicting at least a portion of an additional object within the field of view of the camera, and at least an additional portion of the environment; based at least in part on the additional image data, determining that the additional object is located within the working area inside the electronic fence; and based at least in part on determining that the additional object is located within the working area inside the electronic fence, causing output of at least one additional alert.

13. The method of claim 8, wherein: the first position is associated with a first boundary of the working area associated with the electronic fence; and the second position is associated with a second boundary of the working area associated with the electronic fence.

14. A machine, comprising:
a boom;
a stick having a first end movably connected to the boom, and a second end opposite the first end;
a work implement movably connected to the second end of the stick, the boom, the stick, and the work implement being moveable together, through a range of motion, relative to a frame of the machine;
a camera coupled to the machine, the camera being positioned such that the boom, the stick, and the work implement remain at least partly within a field of view of the camera throughout the range of motion; a sensor configured to determine locations of at least one of the boom, the stick, and the work implement as the at least one of the boom, the stick, and the work implement moves through the range of motion;
one or more processors operably connected to the camera and the sensor; and
one or more non-transitory computer-readable media storing instructions that, when executed by the one or more processors, cause the one or more processors to perform operations comprising:
receiving, from the sensor, first data indicating a first position of the work implement within an environment;
receiving, from the sensor, second data indicating a second position of the work implement within the environment;
defining, based at least in part on the first position and the second position, an electronic fence of the work implement within an environment;
prohibiting the work implement from moving beyond the electronic fence;
receiving, from the camera, image data depicting at least a portion of the environment and at least a portion of a first object and at least a portion of a second object disposed within the field of view of the camera;
determining, based at least in part on the image data, that the first object is disposed at a first location beyond the electronic fence and that the second object is disposed at a second location within the electronic fence;
based at least in part on determining that the first object is disposed at the first location beyond the electronic fence, refraining from generating a first alert indicating a presence of the first object; and
based at least in part on determining that the second object is disposed at the second location within the electronic fence, causing output of a second alert indicating a presence of the second object.

15. The machine of claim 14, the operations further comprising:
receiving additional image data depicting the first object;
based at least in part on the additional image data, determining that the first object is disposed at an additional location within the electronic fence; and
based at least in part on determining that the first object is disposed at the additional location within the electronic fence, causing the output of the first alert.

16. The machine of claim 15, the operations further comprising:
receiving, from the sensor, third data indicating a third position of the work implement in within the electronic fence;
determining, based at least in part on the third data, that the work implement is within a predetermined distance of the first object;
identifying the first object as a person; and
preventing the work implement from moving in a direction towards the first object.

17. The machine of claim 15, the operations further comprising:
receiving, from the camera, further image data depicting the first object;
determining, based at least in part on the further image data, that the first object is disposed at an additional location beyond the electronic fence; and
based at least in part on determining that the first object is disposed at the additional location beyond the electronic fence causing the output of the first alert to terminate.

18. The machine of claim 14, the operations further comprising:
receiving, from the camera, additional image data depicting an additional object within the environment;
determining, based at least in part on the additional image data, that the additional object is disposed at an additional location within the electronic fence; and
based at least in part on determining that the additional object is disposed at the additional location within the electronic fence causing an additional alert to issue.

19. The machine of claim 18, wherein the additional alert comprises at least one of an audible alert or a visual alert.

20. The machine of claim 14, wherein: the electronic fence is defined in coordinate space relative to the machine;
determining the location of the first object comprises determining position coordinates associated with the first object; and
refraining from generating the first alert is based at least in part on comparing the position coordinates of the first object with the coordinate space of the electronic fence to determine that the position coordinates are outside the coordinate space.

* * * * *